(No Model.)
E. BURCH.
ICE TONGS.
No. 526,559. Patented Sept. 25, 1894.
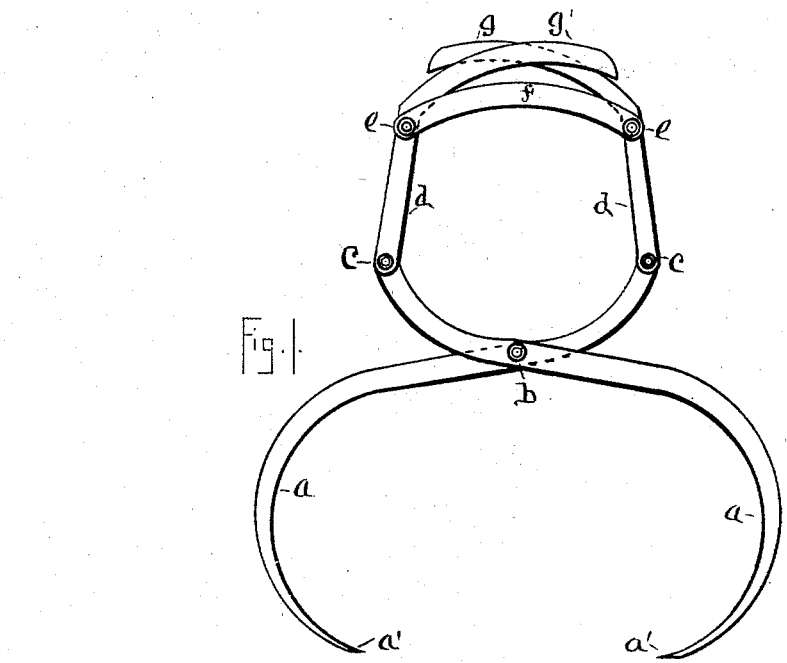
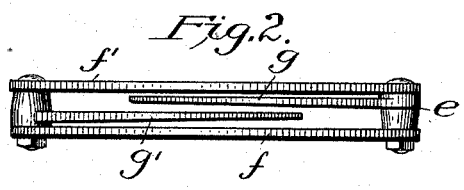

UNITED STATES PATENT OFFICE.

EZRA BURCH, OF ITHACA, NEW YORK, ASSIGNOR OF ONE-HALF TO THERON B. HILL.

ICE-TONGS.

SPECIFICATION forming part of Letters Patent No. 526,559, dated September 25, 1894.

Application filed May 5, 1894. Serial No. 510,209. (No model.)

*To all whom it may concern:*

Be it known that I, EZRA BURCH, a citizen of the United States of America, and a resident of Ithaca, Tompkins county, New York, have invented an Improvement in Ice-Tongs, of which the following is a specification, reference being had to the accompanying drawings.

My invention relates to the handle part of the tongs, above the fulcrum of the tines; and its construction will be apparent as I illustrate, describe, and claim my invention.

Figure 1, is a view looking down on one of the sides of my tongs, and Fig. 2, is an edge view, looking down on the top of the tongs.

In the figures $a, a$ are the two tines or hooks of the tongs, with their fulcrum at $b$; above which they are bent laterally upward; and their upper ends, by the joints $c, c$, connected with the lower ends of the levers $d, d$. These levers extend upward to their fulcrum joints $e, e$, beyond which they are curved inwardly and fold by each other at $g, g$. The fulcrums of these levers, are at the joints $e, e$; which are made at the ends of the cross bars $f$; there being two of the bars, with the levers $d, d$ between them. The cross bars $f$, are the handle of the tongs; and by a little reflection it will be seen, that the lifting upward of the tongs by these bars causes the joints $c, c$ to approach each other; and that closes the points $a', a'$ of the tongs; and when the hand of the user of the tongs, presses on the ends $g', g$ of the levers $d, d$, the joints $c, c$ are forced outward, and that releases the ends $a', a'$ of the tines of the tongs, from their grasp on the blocks of ice. The tongs hold securely as long as the hand of the user lifts upward the bars $f$; and when he forces the ends $g, g'$ downward, he opens the tongs. Everything else is apparent.

What I claim is—

1. In the described tongs; the levers $d, d$, hinged to the tines $a, a$ fulcrumed and hinged at $e\ e$ to the handle bars $f$; and provided with the ends $g, g$, adapted to fold into the space between the bars $f$; in combination with the tines $a, a$ of the tongs, as set forth.

2. The curved handle bar $f$, separated by the levers $d, d$, thus providing a space between them, suited to admit the upper ends of the levers their lower ends being hinged to the tines $a\ a$; in combination with the levers $d, d$ the upper ends of which are bent in curves, adapted to rise above the bars, when the block of ice is grasped; and to be pressed downward to release the tongs, as set forth.

EZRA BURCH.

Witnesses:
T. B. HILL,
SAMUEL J. PARKER.